United States Patent Office 3,091,809
Patented June 4, 1963

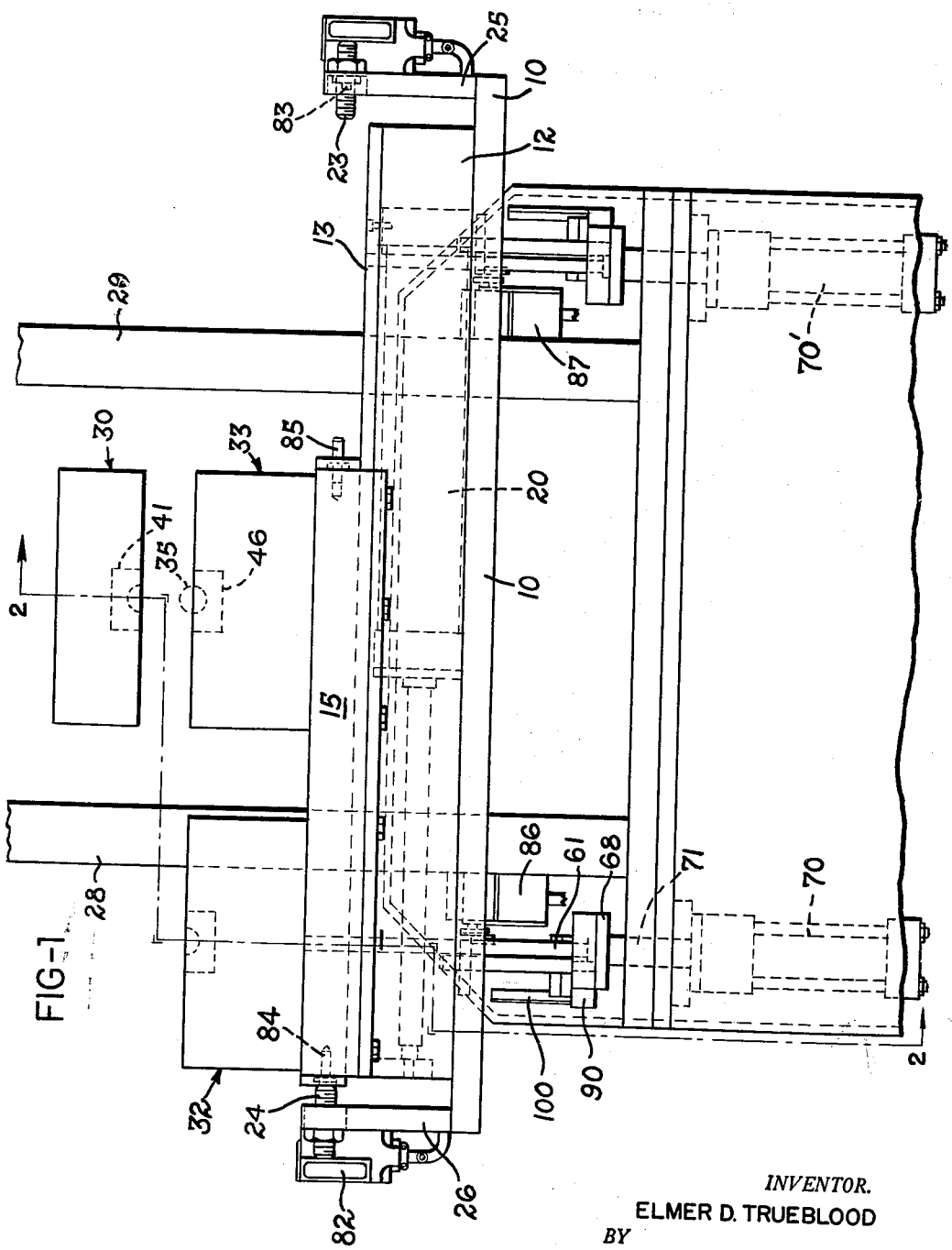

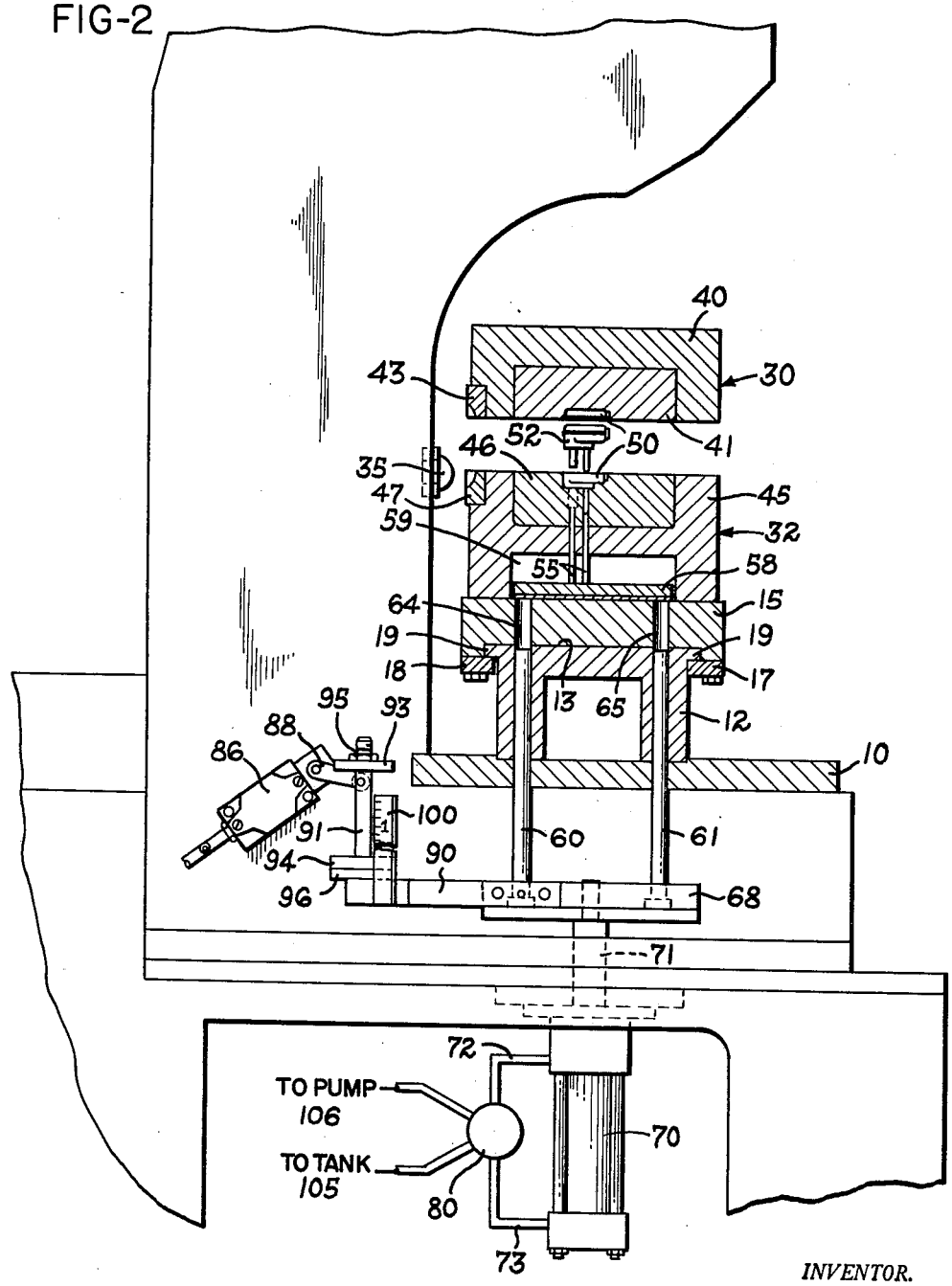

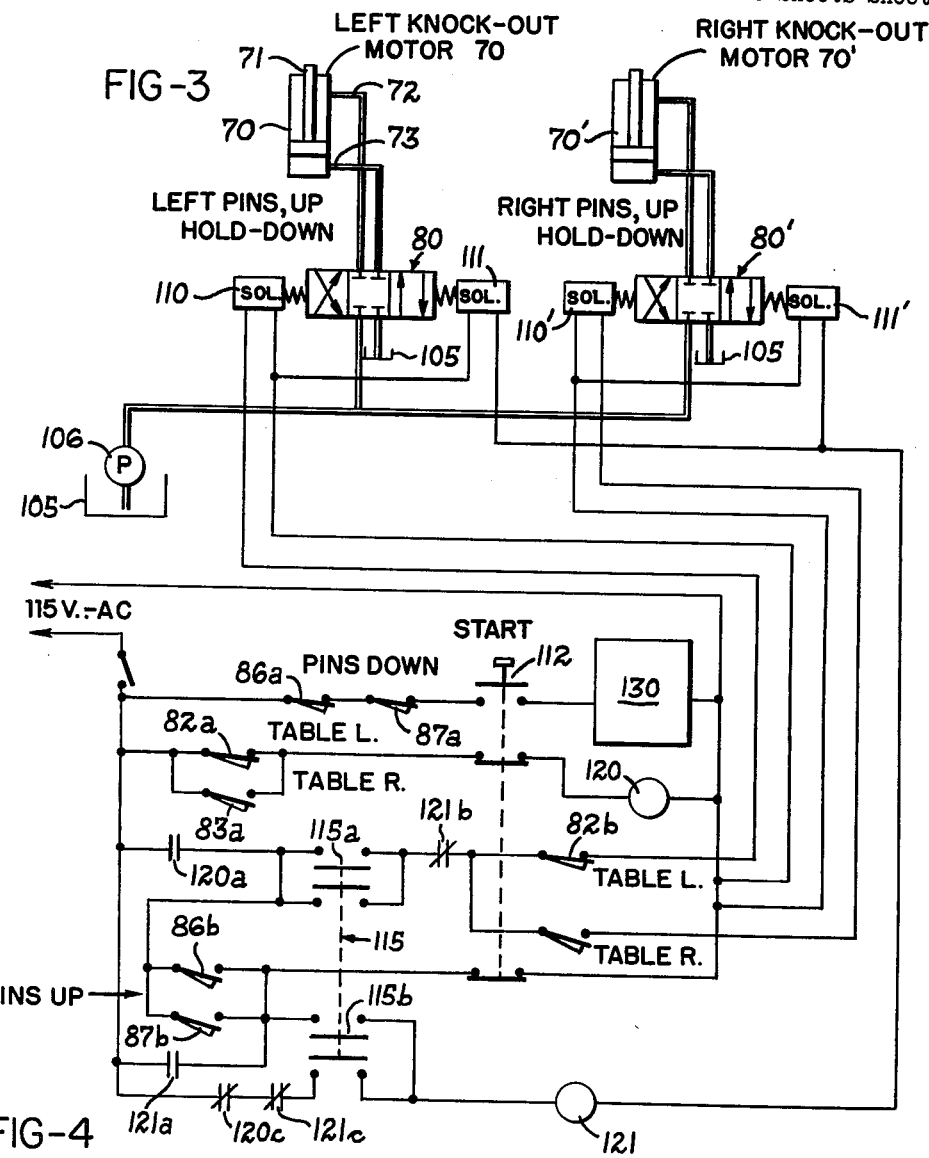

3,091,809
PLASTIC INJECTION MACHINE
Elmer D. Trueblood, Dayton, Ohio, assignor to Trueblood, Inc., Dayton, Ohio, a corporation of Ohio
Filed Dec. 22, 1960, Ser. No. 77,620
2 Claims. (Cl. 18—30)

This invention relates to plastic injection machines, and more particularly to such a machine including mechanism for the automatic ejection of a formed article.

The invention has particular applicability to plastic machines in which two or more bottom mold members are serially moved between injection and ejection stations although various features of this invention may be applied to an injection machine having a mold comprised of a single top and bottom mold member.

The apparatus of this invention provides automatic, accurate, and consistent ejection of a molded article from one half of a mold. The invention preferably includes provision for the regulation of the height of the ejecting movement of knock-out pins, and a scale is provided for visually gauging the extent of movement between full up and full down of the pins. Preferably, the invention provides for the selection of two modes of operation consisting of pin stripping movement and retention in the ejecting position, and the fully automatic extension and return pin stripping movement.

The preferred embodiment of this invention is shown as applied to a plastic machine which includes a movable table upon which a pair of bottom mold members are supported for respective movement into an injecting position, or station, immediately under an upper cooperating mold member, and one of a pair of ejecting stations positioned adjacent the opposite end of the bed.

The ejecting mechanism at each ejecting station includes a fluid piston motor which is arranged to effect the ejection of the article formed and carried within the mold member, by the reciprocation of knock-out pins. A common control circuit is provided for ejecting the mechanism at each of the ejecting stations. This control circuit includes limit switches at the ends of the table movement which determine the position of the table on the bed. The control further includes an adjustable limit switch arrangement by means of which the upward extent of knock-out movement of the knock-out pins is controlled and by means of which the ejecting movement may be adjusted, as desired. A scale adjacent the knock-out limit switch provides a convenient guide for adjustment.

This invention eliminates the mechanical cam-operated workpiece ejectors which are commonly employed in plastic injection machines and which are not readily subject to control of height or mode of operation.

It is therefore an object of this invention to provide a plastic machine as outlined above having a workpiece ejector including a fluid motor.

A further object of this invention is the provision of a plastic machine as outlined above having a fluid knock-out motor with provision for adjusting the height or extent of knock-out movement.

Another object of this invention is to provide an automatic workpiece ejector for plastic injection machines which have a plurality of bottom mold members movable into ejecting stations.

A still further object of this invention is the provision of a molded article ejector mechanism including the selection between fully automatic ejection and retraction or ejection and hold movement of the ejecting pins.

A still further object of this invention is to provide a mechanism as outlined above which is particularly adapted for use in plastic injection machines wherein a plurality of lower mold members are moved in succession into one or more ejecting stations for the automatic ejection of the molded article at each such station.

Other objects and advantages of the invention will be apparent from the following description, the accompanying drawings and the appended claims.

In the drawings:
FIG. 1 is a front elevational view of a plastic machine constructed according to this invention;
FIG. 2 is an end elevational view of the machine of FIG. 1, partly in section, taken generally along the line 2—2 of FIG. 1;
FIG. 3 is an electrical diagram of the control circuit; and
FIG. 4 is a diagram of some of the electrical symbols used in FIG. 3.

Referring to the drawings, which illustrate a preferred embodiment of this invention, a plastic injection machine constructed according to this invention is illustrated in FIGS. 1 and 2 as including a bed having a base plate 10. A shuttle table guide 12 is mounted on the bed 10 and is formed with a flat upper surface 13 upon which a shuttle table 15 is slidably mounted. The table 15 is retained on the table guide 12 by means of gibs 17 and 18 (FIG. 2) positioned respectively along the outer and inner lower edges of the guide 12 for engagement with ledge portions 19 formed on the table guide 12, as is well-known and understood in the art.

The shuttle table 15 is movable on the guide in sequence between two extreme positions by a double-acting hydraulic cylinder 20. The limits of movement of the table 15 may be accurately controlled by a pair of oppositely disposed butt screws 23 and 24 which are respectively mounted in uprights 25 and 26 attached to the guide 12 for engagement with the ends of the table 15.

Injection machines of the type thus far described normally include a vertically movable head (not shown) mounted between the upright supports 28 and 29 within which is carried a top mold member 30. Preferably, a pair of spaced apart lower or bottom mold members 32 and 33 are mounted for movement with the table 15 in such a manner that one of the bottom mold members is in alignment with the upper member 30 while the other bottom mold member is positioned at an ejection station adjacent one of the ends of the shuttle table guide 12. Thus, one of the lower mold members may be injected by a nozzle 35 while the other lower mold member is positioned for stripping an article previously formed therein.

It may be seen in FIG. 2 that this invention is applied to the universal type of molds for plastic injection wherein the upper mold member 30 is formed with a top universal mold shoe 40 and a top sub-shoe 41. The sub-shoe 41 forms a removable insert within the shoe 40. The top shoe 40 also includes one half 43 of a nozzle plate.

Each of the cooperating bottom mold members is formed with a bottom mold shoe 45 which may be generally H-shaped in vertical section, as shown, to provide a recess to receive a bottom mold sub-shoe 46. The mold shoe 45 also supports a cooperating nozzle plate 47. The sub-shoes 41 and 46 respectively form a cavity 50 within which an article 52 is formed by injection plastic molding.

The lower mold members 32 and 33 are preferably identical in their mechanical arrangement and form, and each include ejecting means for the removal of the molded article 52 in order to clear the mold and to make it ready for a subsequent molding operation. This ejecting means may consist of one or more ejector pins 55 which are positioned for vertical reciprocal movement within the shoe 45 and sub-shoe 46. The number of pins 55 and their location are dictated by the nature of the article being formed, and in the illustrated embodiment, two pins 55 are employed to engage the extending electrical terminals of a molded electrical plug forming the article 52. The ejecting means in each of the lower mold members further includes a stripper plate 58 upon which the lower ends of the pins 55 rest, and which is movable within the cavity 59 formed in the shoe 45 to effect ejecting movement of the pins 55. Suitable guide pins or other guide means may be formed on the plate, or provided to cooperate with the plate 58 to assure that it moves vertically without binding or placing a strain upon the ejector pins 55.

The invention includes knock-out means for operating the stripper plate 58 to strip the molds at each of the ejecting stations. In the following description, the knock-out mechanism at one of the stations is described in detail, and it is understood that the mechanical arrangements of the other ejecting stations may be identical in form. Referring to FIG. 2, an ejector plate operating member includes a pair of knock-out pins 60 and 61 which are mounted for reciprocal vertical movement in the bed 10 and the guide 12 adjacent one end of the guide. As clearly shown in FIG. 1, a major portion of each of the pins 60 and 61 is mounted in suitable openings formed in the table guide portion 12 of the bed and the bed base plate 10 providing for guided raising and lowering movement of the pins therethrough. The knock-out pins 60 and 61 are movable between a lowered or retracted position where they clear the table 15 to a raised ejecting position extending through the table. Thus, the table 15 is formed with suitable openings 64 and 65 which move into registering alignment respectively with the pins 60 and 61 when the lower mold member 32 is in the ejecting station at the left-hand end of the guide 12. Operating and mounting means for the knock-out pins 60 and 61 includes a knock-out plate 68 upon which the lower ends of the pins may be secured for vertical movement, and a two-way fluid motor 70 having a piston rod 71 connected to the plate 68 to effect vertical movement thereof.

The motor 70 is preferably of the hydraulic piston type, although it is within the scope of this invention to employ an air motor, or other types of positive displacement fluid motors, for this purpose. Also, the motor 70 is preferably of the double-acting type including a pair of opposite inlets 72 and 73 through which fluid under pressure may be admitted to control the extending and retracting movement of the piston rod 71.

The ejecting movement of the motor 70, and therefore the movement of the pins 60 and 61, is controlled by a three-position, double solenoid, spring-centered valve 80 connected to apply pressure to the inlets 72 and 73. The valve 80 may be operated to effect either extending or retracting movement of the rod 71, or may be centered to hold the rod in any predetermined position. The solenoid coil portions of the valve 80 form a part of a control circuit, shown in detail in FIG. 3. Also, left and right limit switches 82 and 83 (FIG. 1) are arranged to be actuated by the movement of the table 15 in either of its opposite limit positions. The table 15 is preferably provided with separate adjustable push rods 84 and 85 at the opposite ends thereof by means of which the limit switches 83 and 82 are actuated. The purpose of the limit switches is to control the operation of the associated ejector mechanism according to which end of the bed a lower mold member 32 or 33 is positioned for stripping.

The electrical control circuit of FIG. 3 further includes a pair of knock-out limit switches 86 and 87, one each being mounted on opposite sides of the machine. Referring to FIG. 2, the limit switch 86 is seen as including an actuating arm 88 which is extended for operation by the movement of the knock-out plate 68. Specifically, the plate 68 includes an arm-like extension 90 upon which is mounted a threaded rod 91. Adjustable top and bottom nuts 93 and 94 are threaded onto the rod 91 and receive the arm 88 therebetween for operating the switch 85. Lock nuts 95 and 96 retain a given adjustment of the nuts 93 and 94. A knock-out adjustment scale 100 is also attached to the arm 90 and forms the means by which the movement of the knock-out pins 60 and 61 may be visually gauged according to the adjustment of the nuts 93 and 94.

The diagram of FIG. 3 shows the hydraulic and electrical circuit components and their connection for the control of ejector mechanisms at the ejecting stations on the plastic machine of FIGS. 1 and 2. However, this invention is not limited to the particular electrical or hydraulic circuit described, nor is it limited to plastic machines having a shuttle table, and the principles of this invention may be applied to a rotary table wherein a plurality of bottom mold members move serially past injection and ejection stations. Further, the principles of this invention may be applied to apparatus for the ejection of molded parts from a single top or mold member.

In the diagram of FIG. 3, the hydraulic arrangement for the left knock-out cylinder motor 70 is shown. The knock-out cylinder motor for the ejecting mechanism on the opposite end of the table is designated as 70'. Similarly, the control valve for the motor 70' is designated as 80', corresponding to the control valve 80. The motors 70 and 70' are operated respectively through the valves 80 and 80' from a source of hydraulic pressure including a tank 105 and a pump 106, which may, for convenience, consist of the central hydraulic supply for the injection machine.

The valves 80 and 80' are normally centered in their neutral position, as shown, and in this position, the inlets 72 and 73 of the associated cylinder motor 70 or 70' are blocked, and the pump 106 is by-passed to the tank 105. Thus, the pins 60 and 61 are normally held in a given position which may be either the retracted position or an extended position of adjustable height. The valves 80 and 80' each include operating solenoids 110 and 111 which are effective respectively to cause the extension and retraction of the connected knock-out pins.

The electrical portion of the circuit of FIG. 3 is one which has been found suitable for the control of the valves 80 and 80', and includes a start button 112 by means of which an operator may initiate the movement of the table 15 into its opposite positions through the shifting of the table by the cylinder motor 21. The start button includes one "make" and two "break" sets of contacts. The circuit also includes a function selector switch 115 which may be positioned with the start button 112 and the other controls of the injection machine on a control panel convenient to the operator.

The positions of the function selector switch 115 are illustrated in FIG. 4, where it is seen that this switch is of the double-pole, double-throw type with a neutral "off" position. The function switch 115 has contacts connected to the knock-out limit switches 86 and 87 so that an operator can select either a "half" cycle of operation whereby in the knock-out pins 60 and 61 are moved to the raised position and are held there, or he may select a "full" cycle of operation wherein the pins are raised to effect ejection of an article 52 and then are immediately lowered.

The circuit of FIG. 3 further includes a pair of relay coils 120 and 121. The associated relay contacts are designated by 120a, 121a, etc. Further, by way of explanation, the left and right limit switches 82 and 83 are each double-pole, single-throw switches which are normally open, but are closed when contacted by the pins 84 and 85, and their contacts are similarly designated by the suffixes "a" and "b" in the manner of relay contacts. Similarly, the knock-out limit switch 86 at the left side of the table and the limit switch 87 at the right side have contacts designated with the suffixes "a"

and "b." For the purpose of illustration, the electrical circuit is shown with the table 15 in the full left position and with the pins down.

To initiate a sequence of operation, an operator depresses the start button 112. This causes the holding relay 121 to drop out due to the breaking of the circuit to its holding contacts 121a. The start button 112 also causes the table to shift to its opposite position by the motor 120 through the usual table shifting circuit designated at 130 and the closed contacts 86a and 87a. It is assumed that the table 15 is now shifted to the left-hand position. Upon the release of the start button 112, the relay 120 is energized just as soon as the table moves into the left position by the closing of switch contacts 82a.

Relay 120 operates to apply power through relay contacts 120a to the upper half 115a of the function selector switch 115. In either position of the switch 115, power is applied through the normally closed contacts 121b and the closed limit switch contact 82b to the "up" solenoid 110 of the valve 80 which causes an ejecting stroke of the motor 70.

The article 52 is thus ejected by the upward movement of the knock-out pins 60 and 61, which movement is translated by these pins to the stripper plate 58 and the ejecting pins 55. When the pins 55 arrive at an upper limit position as determined by the setting of the knock-out adjusting nut 94, the arm 88 of the switch 86 is tripped overcenter. The closing of the contacts 86b energizes the holding relay 121 which operates to remove the power from the solenoid 110, thus permitting the valve 80 to center and stopping the ejecting movement of the motor 80 at a point determined by the setting of the nut 94. Relay 121 locks in through its holding contact 121a and will not be released until the start button 112 is pushed to initiate a new cycle of operation.

Assuming that the function selector switch 115 is in the "up" position, the ejector pins will be held in the raised position until the start button 112 is depressed again to drop out the holding relay 121. The button 112 also releases relay 120 which therefore permits the solenoid 111 to be energized through the normally closed relay contacts 120c and 121c. The table 15 is interlocked and prevented from shifting until both of the switch contacts 86a and 87a are closed, indicating that the knock-out pins 60 and 61 are in the fully retracted position clear of the openings 64 and 65.

If the function selector switch 115 is set in the "up-down" position, the closing of the contacts 86b of the knock-out limit switch 86 when the pins reach their predetermined upward movement immediately effects the energization of the solenoid 111 to retract the pins through the switch contacts 115b. Thus, the operator is free to remove the loosened article 52 from the lower mold member 32 or 33, and to reload the mold at the ejecting station where it is in the open and clear of the upper mold members. He may then operate the start button 112 when he is ready to shift the table 15 to a new position which places another lower mold member at an ejecting station.

It is therefore seen that the invention provides a molded article ejecting mechanism which is versatile and capable of accurate control. The ejection effected thereby is positive. The height of ejection and the depth of retraction may be suitably selected by positioning the nuts 93 and 94 on the rod 91. The gauge 100 adjacent the rod 91 provides a convenient indication of the extent of movement of the knock-out pins 60 and 61.

The arrangement of the pins 60 and 61 operating through the openings 65 provides versatility in the selection and configuration of lower mold members. Such mold members may include as many ejecting pins 55 on the stripper plate 58 as are convenient or desirable for the efficient ejection of the molded article. Also, the top and bottom mold sub-shoes 41 and 46 may be replaced at the conclusion of a given run or, if necessary, the entire mold shoes may be replaced with substitute shoes which are compatible for use with the knock-out pins 60 and 61.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a plastic injection machine including a bed and a table guide on said bed with a shiftable table on said guide supporting a pair of spaced apart lower mold members for respective movement between a central injecting station and opposite ejecting stations adjacent the ends of said table guide, the improvement comprising knock-out pin supporting means at each of said ejecting stations positioned beneath said bed, upwardly extending knock-out pins for each of said ejecting stations supported at their lower ends directly to said pin supporting means, means in said guide and said bed at each of said ejecting stations defining openings supporting a substantial portion of the length of said pins for guided raising and lowering stripping movement therein with the upper ends of said pins received and supported in said table guide openings beneath said table in the lowered position thereof, means in said table defining openings beneath said lower mold members providing for the movement of the upper ends of said pins therethrough, said pins being proportioned to extend into operative engagement with said lower mold members through said table openings in the raised position thereof, a knock-out pin operating motor for each of said stations including a hydraulic piston motor having a fixed cylinder and a piston rod connected to said knock-out pin supporting means to effect said guided ejecting movement of said pins in said bed and table guide, a source of hydraulic fluid under pressure, a separate electric control valve for each of said motors, and a common control circuit for said valves including a first pair of limit switches for actuation in response to movement of said table into said ejection stations for the respective selection of said control valves to effect the ejection of a molded article from one of said lower mold members at the associated said station, a second pair of limit switches, one for each of said ejecting stations, having contacts connected to control the associated said control valve and positioned to be operated in response to the ejecting movement of said piston rod to limit the extent of raising movement thereof, and a function selector switch in said circuit having a pair of selectable positions with contacts in the first of said selectable positions connected through said second pair of limit switches to provide for the raising and holding of said pins in a raised ejecting position and having further contacts in the second of said selectable positions providing for the raising followed immediately by the lowering of said knock-out pins.

2. In a plastic injection machine including a bed, a movable table on said bed supporting a pair of spaced apart lower mold members carried thereon for respective movement into ejecting stations at opposite ends of said table, the improvement comprising knock-out pins at each of said stations reciprocably mounted in said bed and movable between a lowered position clear of said table and a raised position, means in said table providing for movement of the upper ends of said pins into said raised position with said pins being proportioned to extend through said table and into engagement with said lower mold members, knock-out pin operating means for each of said stations including a 2-way hydraulic piston motor having a cylinder mounted on said bed and an extensible piston rod connected to effect said raising and lowering of the associated said knock-out pins at said stations, hydraulic motor operating means including a source of hydraulic fluid under pressure, a separate three-position, self-centering solenoid operated control valve for each of said motors, each of said valves being connected to said source of hydraulic pressure and having a dead center position and opposite electrically selectable flow reversing positions, each of said valves being connected to one of said hydraulic motors to block movement thereof in said center position and to apply hydraulic pressure thereto selectively to effect raising and lowering thereof in said opposite selectable positions, and a control circuit for said valves including a first pair of limit switches for actuation in response to movement of said table into said ejecting stations for the respective selection of said control valves to effect the ejection of a molded article from the one of the mold members which is in an ejection station, a second pair of limit switches, one for each of said stations having contacts connected to control the associated said control valve and positioned to be operated in response to the ejection movement of said piston rod to limit the extent of upward movement thereof, and a 3-way functon selector switch in said circuit having one position blocking automatic operation and a pair of selectable positions with contacts in the first of said selectable positions connected through said second pair of limit switches to provide for the raising and holding of said pins in a raised ejecting position and further contacts in the second of said selectable positions providing for the raising followed immediately by the lowering of said knock-out pins.

References Cited in the file of this patent

UNITED STATES PATENTS

| | | |
|---|---|---|
| 1,871,406 | DeTurk et al. | Aug. 9, 1932 |
| 2,239,248 | Rieser | Apr. 22, 1941 |
| 2,289,102 | Clark | July 7, 1942 |
| 2,298,044 | Dinzl | Oct. 6, 1942 |
| 2,410,510 | Lester | Nov. 5, 1946 |
| 2,465,889 | Lester | Mar. 29, 1949 |
| 2,582,891 | Strauss | Jan. 15, 1952 |
| 2,675,583 | Scherry | Apr. 20, 1954 |
| 2,757,414 | Chaloupka | Aug. 7, 1956 |
| 2,839,786 | Alesi | June 24, 1958 |

FOREIGN PATENTS

| | | |
|---|---|---|
| 552.020 | Great Britain | Mar. 19, 1943 |